No. 860,209. PATENTED JULY 16, 1907.
W. L. HARDY.
ANIMAL TRAP.
APPLICATION FILED OCT. 20, 1906.
2 SHEETS—SHEET 1.
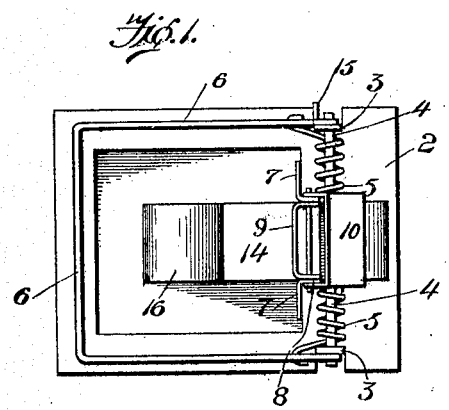
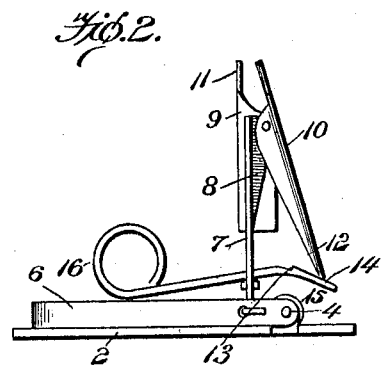
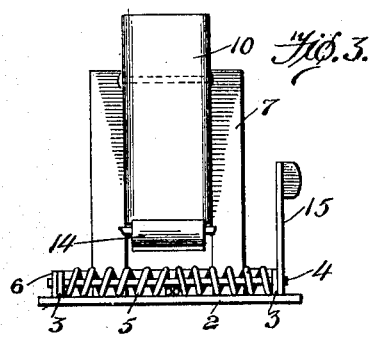
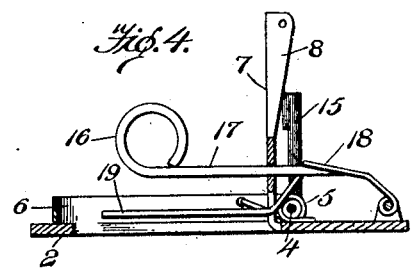
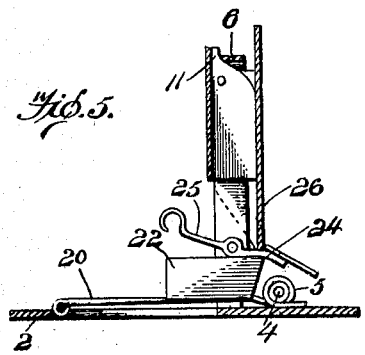
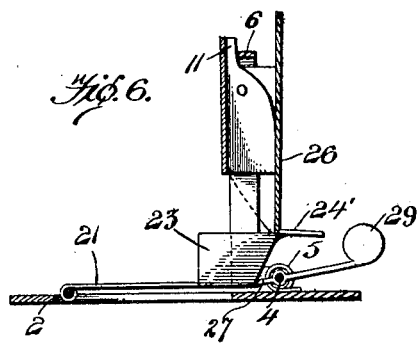
Witnesses
Inventor
Wallace L. Hardy
By David Moore
Attorney

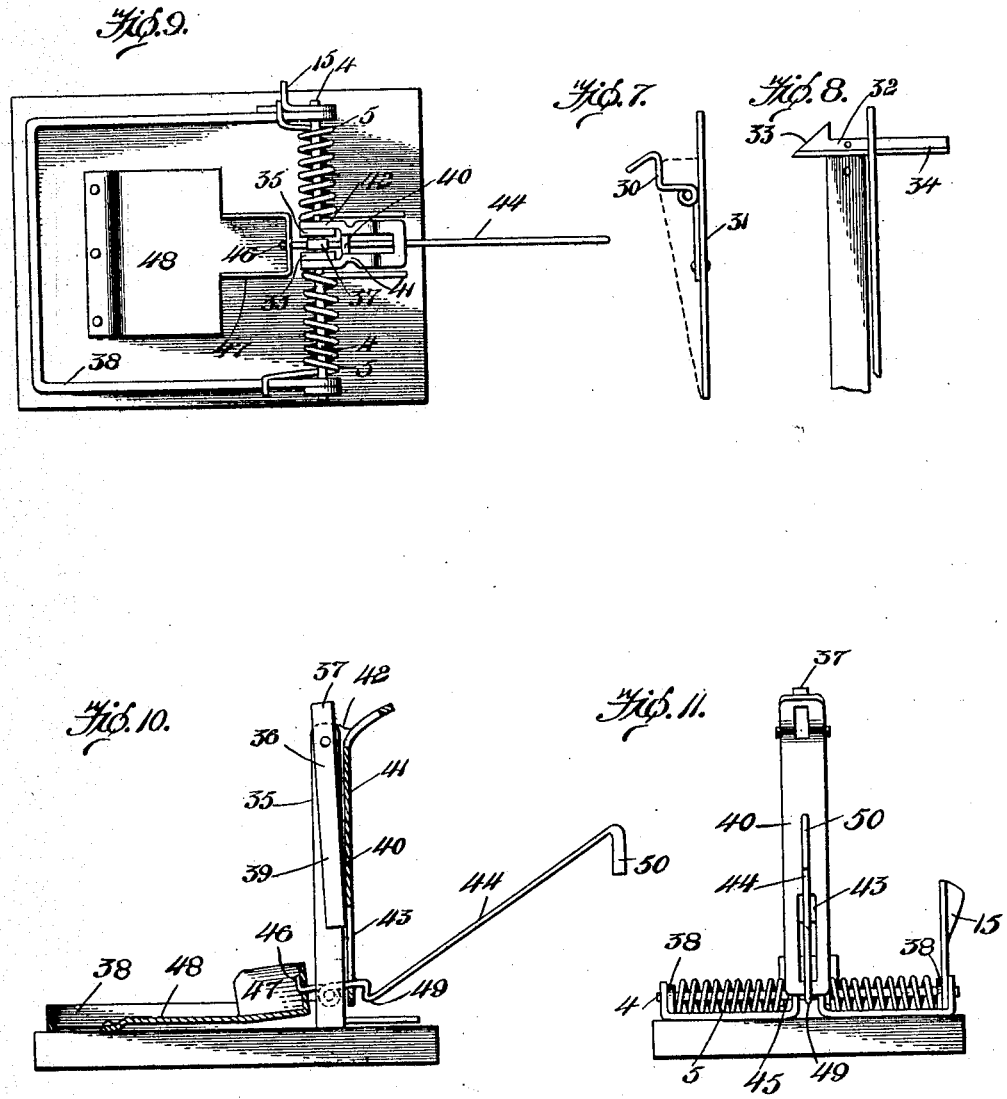

UNITED STATES PATENT OFFICE.

WALLACE L. HARDY, OF JOLIET, ILLINOIS.

ANIMAL-TRAP.

No. 860,209.  Specification of Letters Patent.  Patented July 16, 1907.

Application filed October 20, 1906. Serial No. 339,754.

*To all whom it may concern:*

Be it known that I, WALLACE L. HARDY, a citizen of the United States, residing at Joliet, in the county of Will and State of Illinois, have invented certain new and useful Improvements in Animal-Traps, of which the following is a specification, reference being had therein to the accompanying drawing.

This invention relates to improvements in animal traps, and the main object of my invention is the provision of spring actuated snap trap, provided with an automatically operated catch, which is so constructed as to automatically engage and hold the striker, without the danger of injury to the person "setting" the trap, as it is impossible for the striker to be accidentally sprung.

I have devised many forms of construction for carrying the main idea into effect, and will refer to the accompanying drawings, in which,—

Figure 1 is a top plan view of the preferred form of my animal trap. Fig. 2 is a side elevation thereof, the parts being in the position they assume after the striker is sprung. Fig. 3 is a rear elevation thereof. Fig. 4 is a sectional view of a modified form of my trap. Figs. 5 and 6 are similar views of other modified forms, the striker being in "set" position. Figs. 7 and 8 are detail views of modified forms of catches or triggers. Fig. 9 is a top plan view of a modification employing a "down-pull" treadle. Fig. 10 is a section thereof the striker being shown in "set" position, and Fig. 11 is a rear elevation thereof.

Referring to the drawings,—The animal trap shown in Figs. 1, 2 and 3, consists of a metal frame or base 2, provided with eyed lugs 3, between which is mounted the shaft 4, having mounted thereon, the coiled springs 5, and the bailed striker 6, the ends of the springs being connected to the striker so as to force it to lie normally parallel with the base. Extending upwardly from the base, in front of the lugs, are the pair of uprights or supports 7, having the parallel flanges 8, to which the catch or setting-piece 9, and the auxiliary catch or setting-piece 10, are pivoted, the setting-piece being provided with a lug 11, to engage the striker, while the auxiliary setting-piece is provided with the downwardly projecting end 12, which is adapted to engage the notch or groove 13, of the pivoted treadle or trigger 14. The setting-piece has its lower end so constructed that it exerts pressure against the body of the auxiliary setting-piece, and thus when the striker is engaged by the setting-piece, the auxiliary setting-piece is held more firmly in the groove of the trigger.

In using this construction of the trap, it is simply necessary to raise the striker by means of the handle or arm 15, from the position shown in Fig. 1, to a position practically at right angles to the base, at which position, the setting-piece 9, will be contacted and tilted rearwardly until its upper end slips past the striker, and it then resumes its vertical position, the striker meanwhile contacts the upper end of the setting-piece 10, and forces the lower end thereof in engagement with the notch 13 of the trigger. When the striker is released by removing the pressure on the handle 15, the springs cause it to engage 9, which through contact of its lower end with 10, holds the striker in "set" position. When the free end of the trigger 16, is lifted, the setting-piece 10, is freed and the striker falls.

In the construction of trap, shown in Fig. 4, I employ a modified form of trigger or treadle 17, which is provided with a plate 18, in lieu of the notch 13, the treadle 17, being pivoted to the uprights, and acts as a counterweight to raise the free end 19, of the pivoted lever 18, which I term more properly a platform and trigger combined.

In the construction, shown in Figs. 5 and 6, I deviate more from the construction of the trigger, both triggers 20 and 21, respectively, being pivoted to the forward portion of the base, within the radius of the arc of the striker; and to the free ends are secured the bait boxes 22 and 23, respectively. In the construction shown in Fig. 5, the rear wall of the bait box 22, is connected at 24, to the pivoted auxiliary bait trigger 25, the point of engagement of the two, being the contact point for the auxiliary setting piece 26. The bait box 23, is provided with the contact plate 24, by means of which the auxiliary setting piece is engaged, while in Fig. 6, a counterweight 29, pivoted at the rear of the bait box, so that its short free end 27, engages the lower rear edge of the bait box and holds its point 24', in engagement with the setting piece 26, thus in either of these constructions, should the animal place its weight upon the trigger 20 or 21, the setting piece 26, would be released and consequently the striker.

In Figs. 7 and 8, I modify the construction of the setting piece 9, the setting piece or catch 30, as shown in Fig. 7, being made of a piece of spring wire, and connected to and carried by the auxiliary setting piece or catch 31, this being pivoted as usual; while the catch or setting piece 32, Fig. 8, consists of the angled head 33, and the handle 34, the auxiliary setting piece being pivoted to the catch, so as to allow the head 33, to tilt to engage or release the striker.

In the construction shown in Figs. 9, 10, and 11, I still cling to the main idea of an automatically operated setting means or device, but the construction is slightly modified, as I employ a pair of straight supports or standards 35, between the upper ends of which I pivotally mount the catch or setting piece 36, so that its short upper end 37, will project above the standards and bear against the plate 40, of the auxiliary setting piece 41, which is provided with flanges 42, by means of which it is pivoted to the standards. In order to hold the striker "set," I provide an elongated opening 43, through the piece 41, near its lower end, and through this opening I pass the catch 44, which is pivoted to the striker's shaft 45, and has its short end 46, in engagement with the bait box 47, carried by the platform 48, which is operated by a downward movement, as the animal steps thereon, the angled portion 49, of the catch being tilted upwardly and out of engagement with the lower end of the auxiliary setting piece 41, so that the said piece moves rearwardly caused by the freeing of the striker, as it slides over and becomes disengaged from the upper end of the catch 36.

From the foregoing description taken in connection with the drawings, it is evident that I provide an animal trap, provided with a means whereby the striker is automatically engaged, the same being set, without endangering the hands or fingers of the party setting the trap.

The extreme end 50, of the catch 44, is a counterweight, which easily overbalances the platform, and thus always automatically engages the lower end of the auxiliary setting piece 41.

What I claim as new and desire to secure by Letters Patent, is,—

1. An animal trap, consisting of a spring actuated striker, means for automatically engaging the striker, auxiliary means for holding it engaged after the striker has assumed a "set" position, and means for releasing said auxiliary means to operate the trap.

2. An animal trap, consisting of a spring actuated striker, means for automatically engaging the striker, means for engaging said means for holding the striker "set," and means for releasing said last-mentioned means operated by the animal.

3. An animal trap, consisting of a spring actuated striker, a setting piece to engage the striker, a trigger, and an auxiliary setting piece engaging the trigger and the setting piece to hold the striker in "set" position.

4. An animal trap, consisting of a base, supports carried thereby, a spring actuated striker carried by the base, a setting piece carried by the supports and adapted to engage and hold the striker, a trigger, and an auxiliary setting piece carried by the supports and adapted to engage the trigger and setting piece to hold the striker "set" and be operated by the animal to release the setting pieces and the striker.

5. An animal trap, consisting of a base, a spring actuated striker pivoted thereto, a setting piece pivoted to the base and adapted to engage the striker, a pivoted trigger, and an auxiliary setting piece engaging the trigger and setting piece and forming a lock therebetween, for the purpose set forth.

6. An animal trap, consisting of a base, a spring actuated striker pivoted thereto and capable of a movement of approximately 90°, a setting piece adapted to automatically engage the striker when at approximately 90° to the base, a trigger, and an auxiliary setting piece engaging the setting piece and trigger and forming a lock to hold the striker in such position.

7. An animal trap, consisting of a base, a spring actuated striker pivotally connected to said base, a setting piece adapted to automatically engage said striker when said striker is being "set," a trigger, and an auxiliary setting piece engaging the setting piece and trigger to hold the striker "set."

8. An animal trap, consisting of a base, a pivotally mounted and spring actuated striker carried thereby, a pivoted setting piece for automatically engaging said striker as the striker is being "set," a trigger, and an auxiliary setting piece engaging the setting piece and trigger to hold the striker "set."

9. An animal trap, consisting of a base, a pivotally mounted and spring actuated striker carried thereby, supports carried thereby, a setting piece pivotally mounted upon said supports and adapted to engage the striker as it is being "set," a trigger so connected to the base as to be operated by the animal, and an auxiliary setting piece pivoted to said supports, and adapted to engage the setting piece and trigger to hold the striker "set."

10. An animal trap, consisting of a spring actuated striker, a setting piece for engaging said striker, an auxiliary setting piece pivoted thereto, and a trigger engaging said auxiliary setting piece.

11. An animal trap, consisting of a base, a spring actuated striker mounted thereon, supports carried by said base, a setting piece pivoted in said supports, an auxiliary setting piece pivoted to said setting piece, and a trigger engaging said auxiliary setting piece.

In testimony whereof I affix my signature in presence of two witnesses.

WALLACE L. HARDY.

Witnesses:
ADAM PASOLD,
LOUIS KRAUS.